(No Model.)
W. H. FULLER.
FLY SHUTTER FOR PHOTOGRAPHIC CAMERAS.
No. 392,194. Patented Nov. 6, 1888.
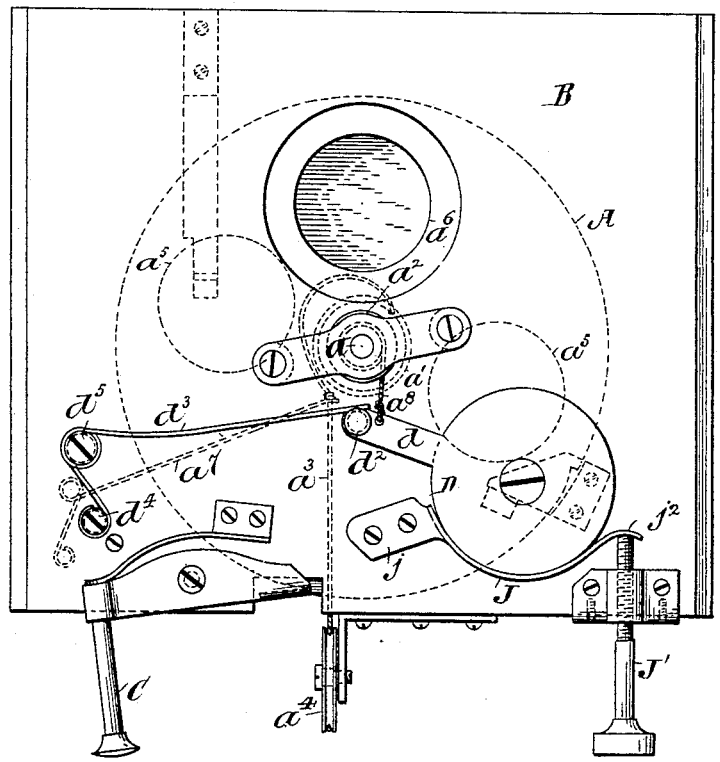
Witnesses.
Geo. Wadman.
M. J. Roach.
Inventor.
Willard H. Fuller.
By his attorneys,
Gifford Brown.

UNITED STATES PATENT OFFICE.

WILLARD H. FULLER, OF PASSAIC, NEW JERSEY, ASSIGNOR TO THE SCOVILL MANUFACTURING COMPANY, OF NEW YORK, N. Y.

FLY-SHUTTER FOR PHOTOGRAPHIC CAMERAS.

SPECIFICATION forming part of Letters Patent No. 392,194, dated November 6, 1888.

Application filed June 6, 1888. Serial No. 276,181. (No model.)

*To all whom it may concern:*

Be it known that I, WILLARD H. FULLER, of Passaic, in the county of Passaic and State of New Jersey, have invented a certain new and useful Improvement in Fly-Shutters for Photographic Cameras, of which the following is a specification.

My improvement consists in novel means for controlling the rapidity with which the fly-shutters shall operate.

I will describe a fly-shutter embodying my improvement in detail and then point out the novel features in claims.

The accompanying drawing is a front elevation of a fly-shutter embodying my improvement and its coacting parts.

A designates the fly-shutter, shown in dotted outline, arranged upon the rear side of a slide or board, B. The shutter is rigidly mounted upon an axle, $a$, extending about centrally through the board B. Rigidly mounted upon the axle $a$ are pulleys $a'$ $a^2$. The pulley $a'$ is at the rear of the shutter. The pulley $a^2$ is in front of the board B. These pulleys are peripherically grooved. Connected to the pulley $a'$ is a cord, $a^3$. This cord passes downwardly and about a pulley, $a^4$, into a position where it may be grasped. When grasped and drawn downwardly, it operates to cause the rotation of the shutter into a position to set the shutter. When in such position, the shutter is retained by a spring-actuated push-piece, C, engaging a notch in the periphery of the shutter. When thus secured and the cord $a^3$ is released, the latter is returned to a normal position by a spring, $a^7$. The mechanism thus far described does not constitute, broadly, part of my invention.

Wound about and secured to the pulley $a^2$ is a cord, $a^8$. This cord is secured at its other end to an arm or projection, $d$, on a brake-wheel, D. This brake-wheel is mounted on a screw or stud, $d'$, secured in the board B. The arm or projection $d$ bears near its free end a pin or projection, $d^2$. Against this pin or projection bears one end of a spring, $d^3$, which spring is, as shown, first coiled about a screw, $d^4$, and then about a screw, $d^5$. The tendency of this spring is to force the arm $d$ downwardly. When the cord $a^3$ is operated to rotate the shutter in the direction to set the shutter, the pulley $a^2$ is also rotated to wind up the cord $a^8$, and consequently to raise the arm $d$ on the brake-wheel against the resistance of the spring $d^3$. When the push-piece C is operated to release the shutter, the spring $d^3$, by its operation on the arm $d$, causes a rotation of the shutter, through the medium of the cord $a^8$, in a direction to cause one of certain openings $a^5$ in the shutter to pass an opening, $a^6$, in the board B, thereby occasioning an exposure.

J designates a brake for the brake-wheel D. This brake, as shown, consists of a flattened piece of metal curved to conform approximately to the arc of the brake-wheel. The flattened piece of metal has, as shown, secured to or made integral with it a flattened piece of metal, $j$, bent at approximate right angles thereto, by which the brake may be secured to the board B. The free end of the brake has a portion, $j^2$, extending away from the brake-wheel.

J' designates an adjusting device for the brake, here shown as a screw. This screw has a bearing in a tapped hole in a bearing-piece, $j^4$, secured to the board B. The inner end of the screw J' bears against the portion $j^2$ of the brake. The latter is resilient, its tendency being to move away from the brake-wheel. By manipulating the adjusting-screw J', therefore, the brake may be made to bind more or less tightly against the brake-wheel, whereby the rapidity with which the spring $d^3$ will act upon the arm $d$ of the brake-wheel may be varied so as to cause a more or less rapid rotation of the shutter, as desired.

What I claim as my invention, and desire to secure by Letters Patent, is—

1. The combination, with a fly-shutter, of a brake-wheel, a connection between the shutter and the brake-wheel, a spring acting on the brake-wheel for causing the movement of the shutter in one direction, a brake for the brake-wheel, and an adjusting device for the brake, substantially as specified.

2. The combination, with a fly-shutter, of a shaft upon which the shutter is mounted, a pulley on the shaft, a brake-wheel, a connection between the pulley and the brake-wheel for causing the movement of the shutter in one direction, a brake for the brake-wheel, and an adjusting device for the brake, substantially as specified.

WILLARD H. FULLER.

Witnesses:
JOS. BARTON,
HENRY P. SEE, Jr.